Nov. 5, 1929.  C. H. BRASELTON  1,734,285
PROCESS FOR MAKING LEAD COMPOUNDS
Filed Dec. 20, 1920
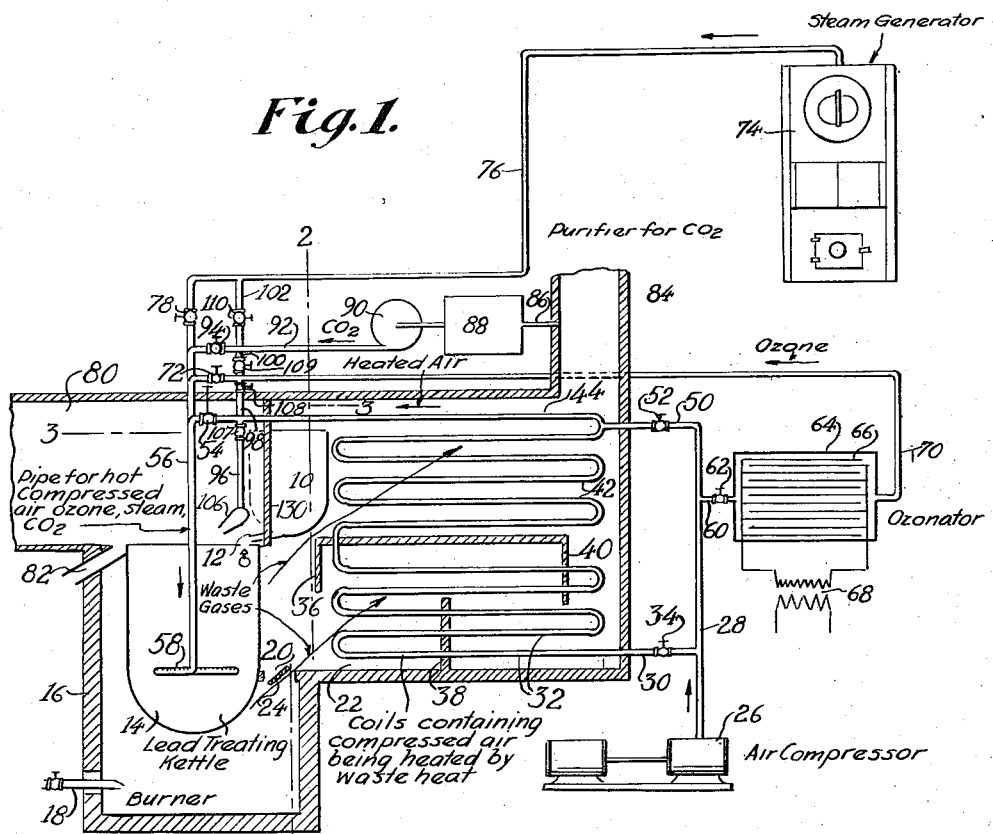
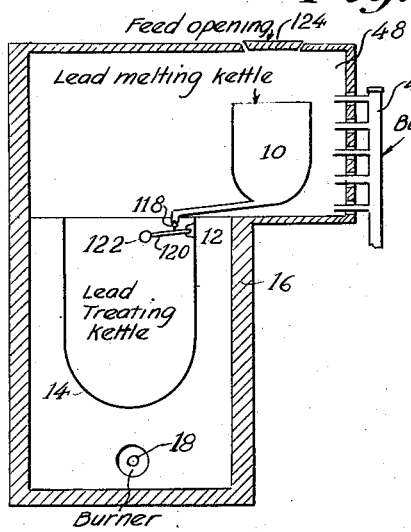
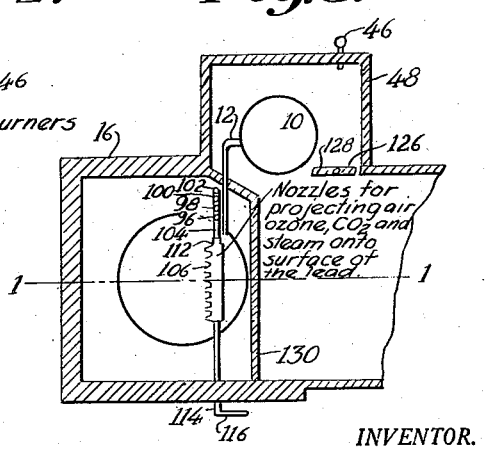
INVENTOR.
Chester H. Braselton.

Patented Nov. 5, 1929

1,734,285

UNITED STATES PATENT OFFICE

CHESTER H. BRASELTON, OF NEW YORK, N. Y.

PROCESS FOR MAKING LEAD COMPOUNDS

Application filed December 20, 1920. Serial No. 432,048.

This invention relates to a process of making lead compounds and more particularly to a process by which white lead and oxides of lead may be rapidly and cheaply made and in which the conditions suitable for producing a particularly product or quality of product may be easily and accurately controlled.

The value of lead products of the type mentioned above lies very largely in certain physical characteristics, such as color and opacity, which are governed by slight changes in the molecular or physical form of the product or in the production of definite chemical compounds, the formation of which cannot be readily controlled during the process of manufacture. It has been found that certain processes developed empirically, as for instance the old Dutch process of making white lead, yields products of very good quality while other processes attempting to accomplish the same result in a shorter period of time fail to produce a product having the desired qualities. In the manufacture of red lead and other lead oxides, processes are also employed which require considerable skill and labor on the part of the operator and which are unnecessarily slow in operation and wasteful of heat. Attempts have been made to produce products of suitable quality by more rapid and more efficient methods, but these processes have heretofore failed to produce products of the desired quality owing to a failure to realize the conditions upon which the production of the desired product depends.

An object of the present invention is to provide a rapid and efficient process of making an excellent quality of lead oxides and other compounds.

A further object of the invention is to provide a process of making lead oxides in which the conditions governing the degree of oxidation and the quality of the product may be accurately controlled.

A further object of the invention is to provide a rapid and cheap process of making white lead, in which the conditions affecting the quality of the product may be accurately controlled to produce a product of excellent quality.

A further object of the invention is to provide an apparatus by means of which oxides of lead and white lead may be rapidly made and in which the conditions governing the making of the product may be readily and accurately controlled.

With these and other objects in view the invention consists in the process and apparatus described in the following specification and defined in the claims.

The various features of the invention are illustrated in the accompanying drawings in which:

Fig. 1 is a sectional elevation, taken on line 1—1 of Fig. 3, of the preferred embodiment of an apparatus suitable for carrying on the process;

Fig. 2 is a sectional elevation of the apparatus taken on line 2—2 of Fig. 1, and;

Fig. 3 is a sectional plan view of a portion of the apparatus, taken on line 3—3 of Fig. 1.

In the present invention a body of lead to be treated is maintained at approximately a temperature suitable for carrying on the reaction for producing the product desired, and air and other gases for treating the lead are passed, at a suitable temperature, through the lead in a number of very fine streams or bubbles. The temperature of the gases entering the lead is controlled to provide the proper conditions for the production of the particular product desired. This control of the temperature is obtained by passing the main portion of the air through a long heated pipe in which it is heated to a temperature somewhat above that required in the treatment of the lead and adding to the heated portion of the air, regulated quantities of cooler air to bring the temperature of the resulting mixture to the desired point. To increase the activity of the air, portions of the air supplied may be by-passed through an ozonating device or other apparatus for activating the oxygen of the air, before bringing it into contact with the heated lead. A small amount of steam may also be added at this point. The oxides of lead resulting from the contact of the hot gases with the lead are carried upwardly with the escaping air and gases and may be separated therefrom by any suitable means or may be retained on the surface of the lead, from which they may be removed mechanically.

In making white lead, steam and carbon dioxide are mixed with the oxidizing gases and the proportions of steam and carbon dioxide and air and ozone are controlled to produce a compound having the proportions of lead carbonate and lead hydroxide necessary to give the products a sufficient opacity or covering power. The temperatures of these are also controlled to permit contact of the gases and of the lead undergoing treatment at a temperature suitable for carrying on the reaction and low enough to avoid the decomposition or dissociation of the products produced. To this end, additional quantities of the gases may be brought into contact with the lead or with the gases leaving the lead, in order to more accurately control the temperature of the gases during their further contact with the particles of lead or product formed during the process.

Referring more particularly to the accompanying drawings, lead to be treated is supplied from a melting kettle 10 through a supply pipe 12 to a treating kettle 14, in which it is contacted with air and other gases necessary to form the particular product desired. The treating kettle 14 is positioned within a furnace 16 and is maintained at a desired temperature, by means of a fluid fuel burner 18 positioned in the lower part of the furnace. The temperature of the lead in the kettle 14 may be controlled by regulating the quantity of fuel supplied through the burner 18, or by by-passing a portion of the hot products of combustion through an opening 20 leading directly to a waste heat chamber 22. The quantity of hot gases by-passed through the opening 20 may be controlled by means of a damper 24 in such a manner that when the damper 24 is closed the gases are compelled to pass under the bottom of the kettle 14 and to circulate around the upper walls of the kettle before passing to the chamber 22.

Air for oxidizing the lead in the kettle 12 is supplied by means of a compressor 26 through an air supply main 28 and branch pipe 30 to a coil of pipe or a number of coils 32 positioned in the waste chamber 22. The quantity of air supplied to the heating coils 32 is controlled by means of a valve 34 in the branch pipe 30. The hot products of combustion supplied to the chamber 22 from the furnace 16 are caused to pass back and forth over the heating coils 32 in a comparatively long path by means of a number of baffles 36, 38 and 40, thus causing a thorough contact of the gases with the coils and thereby obtaining a maximum absorption of heat from the heating gases. From the coil 32 the heated air passes to a second coil or set of coils 42, positioned in a heating chamber 44 immediately above the chamber 22 and is heated to a still higher temperature by means of burners 46 positioned in a furnace 48 surrounding the melting kettle 10 and communicating with the heating chamber 44. In the chamber 44 the air is heated to a temperature suitable for the treatment of lead or may be raised to a temperature somewhat above that suitable for the treatment. In the latter case the temperature of the air is brought to the desired point before contacting with the lead, by by-passing an additional quantity of cold air from the supply main 28 to the exit end of the coil 42 through a branch pipe 50 and control valve 52. The temperature of the air leaving the coils 42 is measured by means of a thermocouple or other suitable pyrometric apparatus and the opening of the valves 34 and 52 are adjusted to obtain the desired temperature.

From the coil 42 the air is admitted through a control valve 54 to a pipe 56 extending downwardly to nearly the bottom of the lead in the kettle 14. The lower end of the pipe 56 is formed into a perforated ring or other distributing device 58, by means of which the air is divided into a large number of very small streams or bubbles distributed throughout the mass of lead in the kettle 14. A very large area of contact between the lead and the treating gases and a correspondingly rapid treatment of the lead is thereby obtained.

The activity of the air or oxygen may be increased by by-passing a portion of air from the supply main 28 through a connecting pipe 60 and control valve 62 to an ozonating device 64 in which the air passes between plates 66 alternately charged with electricity of opposite potentials by means of a step-up transformer 68. From the ozonator 64 the ozonated or highly activated oxygen passes through a pipe 70 and a control valve 72 to the pipe 56 and is mixed with the hot air just prior to the entrance of the latter into the distributor 58. By means of the valves 34, 52 and 62 the temperature and relative proportions of air or oxygen and ozone may be controlled to maintain the proper temperature conditions for obtaining any desired degree of oxidation. A small quantity of steam may also be admitted from a steam generator 74 and a steam pipe 76, the quantity admitted being controlled by a control valve 78.

The oxides of lead produced by the action of the hot air and ozone or activated oxygen are carried to the surface of the molten lead by the upwardly passing bubbles of gas. A portion of the oxides may be projected above the surface of the lead and carried along with the hot gases while the remainder may float on the surface of the lead.

The air and suspended particles of oxide pass from the surface of the lead through a conduit 80 to a settling chamber, or electric precipitator or other suitable separating means, not shown, in which the suspended particles may be separated from the gases. That portion of the oxides which accumulates on the surface of the molten lead flows over the upper edge of the kettle into an inclined conduit 82 and is removed.

When white lead is desired instead of lead oxides the quantity of steam supplied through the pipe 76 is increased by opening the valve 78 and a supply of carbon dioxide is also added to the gases entering the pipe 56. The carbon dioxide for this purpose may be supplied from any suitable source. In the apparatus shown in the accompanying drawings, the supply of carbon dioxide is taken from a flue or stack 84 receiving the waste products of combustion from the heating chambers 22 and 44. For this purpose a stream of carbon dioxide is continuously drawn from the stack 84 through a pipe 86 and purifier 88 by means of a blower or air pump 90 and forced through a connecting pipe 92 and control valve 94 into the pipe 56. In the purifier 88 the carbon dioxide is carefully filtered and purified of gases which might injure the product. The proportions of air, ozone, steam and carbon dioxide are carefully controlled by the valves 54, 72, 78 and 94 to provide the required quantities of the various reagents to form the proper proportions of the lead carbonate lead hydroxide in the product. The carbonates and lead hydroxides are normally in the proportion of 2 molecular weights of lead carbonate to one molecular weight of lead hydroxide.

The temperature of the gases is also controlled to bring the resulting temperature of the molten lead in the kettle 14, as near as possible to a point involving the minimum decomposition of the products proudced. Lead hydroxide decomposes at a comparatively low temperature and it is desirable to surround the particles of white lead during cooling with an atmosphere containing the proper amounts of steam and carbon dioxide. Additional quantities of air, ozone, carbon dioxide and steam are therefore supplied to the space immediately above the molten lead and brought into intimate contact with the converted or partly converted lead reaching the surface of the mass of molten lead. To this end a portion of gases passing from the coil 42, pipes 70, 92 and 76 are withdrawn through pipes 96, 98, 100 and 102 respectively, and admitted through a manifold 104, Fig. 3, to a nozzle or series of nozzles 106, positioned a short distance above the surface of the lead in the kettle 14. The quantities of the different gases supplied through the pipes 96 to 102 are controlled by valves 107, 108, 109 and 110 respectively, to provide the proper proportions of the various racting gases. A connecting collar 112 is provided between the manifold 104 and the nozzles 106, in such a manner that the nozzle may be turned about the axis of the manifold 104 by means of a shaft 114 and a crank 116 projecting outside of the furnace walls, to project the gases at any desired angle against the surface of the lead or the particles which are projected upwardly above the surface of the lead. The temperature of the gases introduced in this manner may, of course, be regulated so that when mixed with products emerging from the lead, the proper temperature for carrying on the reaction without a decomposition of the white lead being produced will be obtained.

The treatment of the lead is, however carried on principally in the kettle 14, the additional supply of gases above the surface of the lead being principally for the purpose of increasing the time of reaction in case the treatment of the lead is not completed in the kettle 14, and to permit a controlled and more rapid cooling of the products carried above the surface of the lead. To maintain the conditions in the kettle 14 constant and to insure a clean separation of oxides and other products from the surface of the lead, the lead is maintained at a substantially constant level. To this end, the passage of molten lead from the melting kettle 10, thru the outlet 12, is controlled by means of a valve 118, mounted on a lever 120, the position of which is governed by means of a float 122 as shown diagrammatically in Fig. 2. Any other suitable means for controlling the level of the lead may, of course, be employed. A feed opening 124 is provided in the top of the furnace 48, immediately above the melting kettle 10 for adding of additional supplies of lead.

The heat for melting the lead in the kettle 10 is supplied by the burners 46 before passing to the heating chamber 44. Ordinarily the greater portion of the flame from the burners 46 passes thru a passage 126 directly to the heating chamber 44, but a portion of these gases may be forced to travel around the kettle 10 by partly closing a damper 128 in the opening 126. A partition 130 is provided between the chamber 44 and the space above the kettle 14 to prevent the admission of the furnace gases to the oxidized and treated lead.

By means of the process and apparatus described above, the temperatures, rate of treatment, and proportions of the treating gases may be rapidly or accurately controlled or adjusted to maintain those conditions which favor the production of any desired product. The apparatus is moreover economical in heat and has comparatively large capacity. It will be understood, however, that minor changes may be made in the apparatus without changing the essential features, except in so far as limited in the following claims.

Having described the invention, what is claimed as new is:

1. A process of making oxides of lead which comprises maintaining a mass of molten lead at a high temperature, passing through said lead a mixture of air and ozone and controlling the quantities and temperatures of said air and ozone to control the degree of oxidation of said lead.

2. A process of making oxides of lead which comprises maintaining a mass of molten lead at a high temperature, passing through said molten lead a mixture of air, ozone and steam and controlling quantities and temperatures of said gases to control the degree of oxidation of said lead.

3. A process of making oxides of lead which comprises maintaining a mass of molten lead at a high temperature, heating a current of air, passing said air into said lead in the presence of ozone, and controlling the proportions of air and ozone and the temperature of said air to control the degree of oxidation of said lead.

4. A process of making oxides of lead which comprises maintaining a mass of molten lead at a high temperature, heating a current of air and passing said air through said lead in the presence of ozone.

5. A process of making oxides of lead which comprises maintaining a mass of molten lead at a high temperature, passing into said lead a mixture of heated air and ozone and bringing additional quantities of air and ozone into contact with the upper surface of said lead.

6. A process of making oxides of lead which comprises maintaining a mass of molten lead at a high temperature passing into said lead a mixture of air, steam and ozone and bringing additional quantities of air into contact with said lead at the upper surface of said lead.

7. A process of making oxides of lead which comprises maintaining a mass of molten lead at a high temperature, and passing into said lead gases containing highly activated oxygen.

8. A process of making oxides of lead which comprises maintaining a mass of molten lead at a high temperature and passing through said lead a number finely divided streams of mixed air and ozone.

9. A process of making oxides of lead which comprises maintaining a mass of molten lead at a high temperature and passing through said lead a number of finely divided streams of mixed air and ozone, and controlling the relative proportions of air and ozone to control the oxidation of said lead.

10. A process of making oxides of lead which comprises maintaining lead at a high temperature, passing through said lead a mixture of air and ozone and controlling the relative proportions of said air and ozone.

11. A process of making oxides of lead which comprises maintaining a mass of molten lead at a high temperature and passing through said molten lead a mixture of air, ozone and steam and controlling the proportions and temperatures of said gases.

12. A process of making oxides of lead which comprises maintaining a mass of molten lead at a high temperature, heating a current of air, adding to said heated current of air addition quantities of air and ozone and passing said air mixture through said lead.

13. The process of manufacturing lead compounds which comprises intimately associating an oxidizing gaseous mixture with molten lead and intermingling with the evolved products arising from the molten lead a gaseous mixture of reactive composition.

14. The process of manufacturing lead compounds which comprises intimately associating an oxidizing gaseous mixture with molten lead and intermingling with the evolved product a gaseous mixture having oxidizing characteristics.

15. The process of manufacturing lead compounds which comprises intimately associating an oxidizing gaseous mixture with molten lead and controlling the rate of cooling of the evolved products.

16. The process of manufacturing lead compounds which comprises intimately associating an oxidizing gaseous mixture including air and steam with molten lead and intermingling with the products evolved from the molten lead a gaseous mixture of reactive composition.

17. The process of manufacturing lead compounds which comprises intimately associating an oxidizing gaseous mixture including air and steam with molten lead, and intermingling with the products evolved from the molten lead a gaseous mixture of reactive composition and regulating the temperature of the said reactive composition.

18. In the manufacture of oxidic lead compounds, that step which comprises associating a gaseous composition with molten lead, said composition including ozone.

In testimony whereof, I affix my signature.

CHESTER H. BRASELTON.